United States Patent
Kobayashi et al.

(10) Patent No.: US 6,740,700 B2
(45) Date of Patent: May 25, 2004

(54) RUBBER COMPOSITIONS AND METHODS FOR PRODUCING THE SAME

(75) Inventors: Naokazu Kobayashi, Tokyo (JP); Toshihiro Tadaki, Tokyo (JP); Hiroshi Akema, Tokyo (JP)

(73) Assignee: JSR Corporation, Tokyo (JP)

( * ) Notice: Subject to any disclaimer, the term of this patent is extended or adjusted under 35 U.S.C. 154(b) by 244 days.

(21) Appl. No.: 09/983,626

(22) Filed: Oct. 25, 2001

(65) Prior Publication Data

US 2002/0082334 A1 Jun. 27, 2002

(30) Foreign Application Priority Data

Oct. 26, 2000 (JP) .................................. 2000-327111

(51) Int. Cl.[7] .............................. C08J 3/00; C08K 3/34; C08K 3/00; C08K 3/18; C08L 57/02
(52) U.S. Cl. ...................... 524/492; 524/401; 524/432; 524/493; 524/495; 524/496; 524/499
(58) Field of Search ................................. 524/492, 493, 524/401, 432, 495, 496, 499

(56) References Cited

U.S. PATENT DOCUMENTS 5,916,951 A  6/1999  Nahmias et al.
6,127,472 A  10/2000 Kobayashi et al.
6,344,518 B1  2/2002  Kobayashi et al.

FOREIGN PATENT DOCUMENTS

| EP | 0 738 755 | 10/1996 |
|---|---|---|
| EP | 0 806 452 | 11/1997 |
| EP | 0 870 786 | 10/1998 |
| EP | 0 994 150 | 4/2000 |
| JP | 9-3245 | 1/1997 |

*Primary Examiner*—Patrick D. Niland
(74) *Attorney, Agent, or Firm*—Oblon, Spivak, McClelland, Maier & Neustadt, P.C.

(57) ABSTRACT

An objective of the present invention is to provide rubber composition and method for producing the same capable of giving a vulcanized rubber which has an excellent processability and a sufficient wearing resistance and which is useful for a tire. A rubber composition in the invention is obtained by the following step of preparing a first rubber formulation [P1] by kneading a formulation (A1) comprising a rubber component containing a conjugated diene-based rubber and a silica, preparing a second rubber formulation [P2] by kneading a formulation (B1) comprising a mixed material containing a silane coupling agent and the first rubber formulation [P1], and kneading a formulation (C) comprising the second rubber formulation [P2], a zinc oxide and a vulcanizing agent. Such conjugated diene-based rubber is preferably one having at least one selected from the group consisting of an alkoxysilyl, an amino, a hydroxyl and an epoxy groups.

16 Claims, No Drawings

RUBBER COMPOSITIONS AND METHODS FOR PRODUCING THE SAME

FIELD OF THE INVENTION

The present invention relates to a method for producing a rubber composition by incorporating a silica as a reinforcing agent into a conjugated diene-based rubber, which can raise the temperature at which the rubber and the silica are kneaded and which can reduce the frequency of the kneading, whereby reducing the time period required for the production. The invention also relates to a method for producing a rubber composition capable of reducing the time period required for producing a composition and also capable of improving the physical properties of the rubber for a tire especially when the conjugated diene-based rubber has a specific functional group.

DESCRIPTION OF THE RELATED ART

In response to a recent demand for a low gas mileage of an automobile, a rubber composition for a tire having a sufficient hardness, a low rolling resistance, an excellent wearing resistance and a wet skid resistance, as a representative index of the steering stability, which is satisfactorily high is demanded. In order to reduce the rolling resistance of a tire, the hysteresis loss of a vulcanized rubber should be reduced. This hysteresis loss can evaluate variety of physical properties such as tanδ at the temperature of 50 to 80° C. as an index. A raw rubber having a low hysteresis loss may for example be a natural rubber, an isoprene rubber or a butadiene rubber, which has a problematically low wet skid resistance.

On the other hand, a method in which a silica or a combination of a silica and a carbon black was used as a reinforcing agent in a rubber composition for a tire was proposed recently. A tire tread in which a silica or a combination of a silica and a carbon black is incorporated is excellent in the steering stability which is reflected mainly on the wet skid resistance and also has a low rolling resistance. Nevertheless, it involves a problem which is a poor wearing resistance of the vulcanized rubber. One of the reasons for such problem is considered to be a difficulty in obtaining a sufficient reinforcing effect due to a poor dispersion of the silica resulting from a lower compatibility with a conjugated diene-based rubber when compared with a carbon black.

In order to increase the compatibility between a silica and a conjugated diene-based rubber and to disperse the silica sufficiently, a silane coupling agent is employed generally. It is also suggested to employ a conjugated diene-based rubber into which a functional group having an affinity with a silica is introduced, and conjugated diene-based rubbers into which an alkoxysilyl group, an amino group, a hydroxyl group and the like are introduced are proposed.

Nevertheless, the dispersion of a silica, when the silica and a silane coupling agent are incorporated simultaneously into a conjugated diene-based rubber and then kneaded, is not always satisfactory because of the limitation in the kneading temperature and the like, and the physical properties of a vulcanized rubber is not improved. Also when a conjugated diene-based rubber into which a specific functional group described above is introduced is employed, it allows, upon being combined simultaneously with a conjugated diene-based rubber, a silica and a silane coupling agent and then kneaded, the reaction between the rubber and the silica to be inhibited by the silane coupling agent, resulting in a poor dispersion of the silica, and also allows a heat to be generated during a processing, resulting in a poor processability.

SUMMARY OF THE INVENTION

The invention is intended to solve the problems described above, and thus to provide a method for producing a rubber composition which is capable of increasing the kneading temperature of the formulation, reducing the kneading frequency and reducing the required time period when incorporating a silica as a reinforcing agent into a rubber composition containing a conjugated diene-based rubber, as well as a rubber composition obtained by the same. This invention also is intended to provide a method for producing a rubber composition capable of reducing time as well as dispersing the silica sufficiently and increasing the reinforcing effect especially when the conjugated dien-based rubber has a specific functional group, resulting in improving the physical properties of the rubber for a tire.

When a silica and a silane coupling agent are incorporated simultaneously into a conjugated diene-based rubber and then kneaded, the silane coupling agent employed customarily in this technical field which contains a sulfur atom in its molecular structure undergoes a cleavage, resulting in a crosslinking of the rubber molecules which leads to a gelation. Accordingly, in a conventional manner, the kneaded material is taken out from a kneader when its temperature reached 140 to 150° C. However, this manner can not disperse a silica in a conjugated diene-based rubber sufficiently, and requires 4 to 5 cycles of a procedure, each cycle involving a step in which a kneaded material is cooled once to about room temperature, loaded in the kneader again and then discharged from the kneader when it is heated to 140 to 150° C. Accordingly, the procedure is complicated and a long time is required for producing a rubber composition.

Now we found that by incorporating a rubber component containing a conjugated diene-based rubber and a silica, and kneading to form a rubber formulation followed by incorporating a silane coupling agent and kneading again to form a rubber formulation, it is possible to raise the temperature at which the rubber component containing the conjugated diene-based rubber and the silica are kneaded to a temperature as high as 170 to 180° C. Accordingly, this first kneading step is found to be enough to disperse the silica satisfactorily, resulting in a reduced kneading frequency which leads to a reduced time period required for producing a rubber composition. In addition, it was also discovered that when the conjugated diene-based rubber has a specific functional group capable of reacting with a silica the reinforcement by the silica is sufficient and the physical properties of a vulcanized rubber is further improved.

The present invention is based on the findings described above and can be described as follows.

1. A method for producing a rubber composition comprising:
   a step for preparing a first rubber formulation [P1] by kneading a formulation (A1) comprising a rubber component containing a conjugated diene-based rubber and a silica;
   a step for preparing a second rubber formulation [P2] by kneading a formulation (B1) comprising a mixed auxiliary material containing a silane coupling agent and said first rubber formulation [P1]; and
   a step for kneading a formulation (C) comprising said second rubber formulation [P2], a zinc oxide and a vulcanizing agent.

2 The method for producing a rubber composition according to 1 above, wherein terminal temperature for kneading said formulation (A1) is 150 to 190° C., and terminal temperature for kneading said formulation (B1) is 130 to 170° C.

3. The method for producing a rubber composition according to 2 above, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy groups.

4. The method for producing a rubber composition according to 3 above, further comprising an extending oil in said formulation (A1).

5. A method for producing a rubber composition comprising:
   a step for preparing a first rubber formulation [Q1] by kneading a formulation (A2) comprising a rubber component containing a conjugated diene-based rubber and a silica;
   a step for preparing a second rubber formulation [Q2] by kneading a formulation (B2) comprising a mixed auxiliary material containing a silane coupling agent and said first rubber formulation [Q1] and by continuing kneading a formulation (D) incorporating a mixed auxiliary material containing a zinc oxide to said formulation (B2); and
   a step for kneading a formulation (E) comprising said second rubber formulation [Q2] and a vulcanizing agent.

6. The method for producing a rubber composition according to 5 above, wherein terminal temperature for kneading said formulation (A2) is 150 to 190° C., and terminal temperature for kneading said formulation (D) is 140 to 160° C.

7. The method for producing a rubber composition according to 6 above, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy groups.

8. The method for producing a rubber composition according to 7 above, further comprising an extending oil in said formulation (A2).

9. A rubber composition produced by following method comprising:
   a step for preparing a first rubber formulation [P1] by kneading a formulation (A1) comprising a rubber component containing a conjugated diene-based rubber and a silica;
   a step for preparing a second rubber formulation [P2] by kneading a formulation (B1) comprising a mixed auxiliary material containing a silane coupling agent and said first rubber formulation [P1]; and
   a step for kneading a formulation (C) comprising said second rubber formulation [P2], a zinc oxide and a vulcanizing agent.

10. The rubber composition according to 9 above, wherein terminal temperature for kneading said formulation (A1) is 150 to 190° C., and terminal temperature for kneading said formulation (B1) is 130 to 170° C.

11. The rubber composition according to 10 above, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy groups.

12. The rubber composition according to 11 above, wherein comprising 5 to 30 parts by mass of carbon black based on 100 parts by mass of said silica.

13. The rubber composition according to 11 above, further comprising an extending oil in said formulation (A1).

14. The rubber composition according to 13 above, wherein comprising 5 to 30 parts by mass of carbon black based on 100 parts by mass of said silica.

15. A rubber composition produced by following method comprising:
   a step for preparing a first rubber formulation [Q1] by kneading a formulation (A2) comprising a rubber component containing a conjugated diene-based rubber and a silica;
   a step for preparing a second rubber formulation [Q2] by kneading a formulation (B2) comprising a mixed auxiliary material containing a silane coupling agent and said first rubber formulation [Q1] and by continuing kneading a formulation (D) incorporating a mixed auxiliary material containing a zinc oxide to said formulation (B2); and
   a step for kneading a formulation (E) comprising said second rubber formulation [Q2] and a vulcanizing agent.

16. The rubber composition according to 15 above, wherein terminal temperature for kneading said formulation (A2) is 150 to 190° C., and terminal temperature for kneading said formulation (D) is 140 to 160° C.

17. The rubber composition according to 16 above, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy groups.

18. The rubber composition according to 17 above, wherein comprising 5 to 30 parts by mass of carbon black based on 100 parts by mass of said silica.

19. The rubber composition according to 17 above, further comprising an extending oil in said formulation (A1).

20. The rubber composition according to 19 above, wherein comprising 5 to 30 parts by mass of carbon black based on 100 parts by mass of said silica.

According to the present invention, a silica can sufficiently be dispersed and contained in a rubber component containing a conjugated diene-based rubber, whereby forming a satisfactorily processable rubber composition. In addition, vulcanized rubber by vulcanizing this rubber composition is excellent for example in the wet skid performance, has a sufficient wearing resistance, and is useful especially for a tire. Furthermore, by using a conjugated diene-based rubber having a specific functional group, it is possible to improve the physical properties of the vulcanized rubber substantially.

DETAILED DESCRIPTION OF THE INVENTION

A method for producing a rubber composition of the first aspect of the invention is a method which comprises
   a step for preparing a first rubber formulation [P1] by kneading a formulation (A1) comprising a rubber component containing a conjugated diene-based rubber and a silica;
   a step for preparing a second rubber formulation [P2] by kneading a formulation (B1) comprising a mixed auxiliary material containing a silane coupling agent and the above-mentioned first rubber formulation [P1]; and a step for kneading a formulation (C) comprising the above-mentioned second rubber formulation [P2], a zinc oxide and a vulcanizing agent.

A method for producing a rubber composition of the second aspect of the invention is a method which comprises a step for preparing a first rubber formulation [Q1] by kneading a formulation (A2) comprising a rubber component containing a conjugated diene-based rubber and a silica;

a step for preparing a second rubber formulation [Q2] by kneading a formulation (B2) comprising a mixed auxiliary material containing a silane coupling agent and the above-mentioned first rubber formulation [Q1] and by continuing kneading a formulation (D) incorporating a mixed auxiliary material containing a zinc oxide to the above-mentioned formulation (B2); and a step for kneading a formulation (E) comprising the above-mentioned second rubber formulation [Q2] and a vulcanizing agent.

The rubber component described above in the first and second aspects of the invention may be only a specific conjugated diene-based rubber mentioned below or a mixture that combines a conjugated diene-based rubber and the other rubber component. The other rubber component includes an urethane rubber, a silicon rubber, a fluoro elastomer, an acrylic rubber, an ethylene-propyrene-diene copolymer rubber and the like. In the case of employing the conjugated diene-based rubber and the other rubber, the amount of the other rubber is 0 to 50 parts by mass based on 100 parts by mass (hereinafter abbreviated as parts) of the conjugated diene-based rubber.

The term "a first rubber formulation" described above in the first and second aspects of the invention can be prepared by kneading the formulation (A1) or (A2) that comprises the rubber component containing the conjugated diene-based rubber and a silica. The formulation (A1) and (A2) may also contain a variety of auxiliary components. Small amount of silane coupling agent may also be contained. It is preferable that silane coupling agent is not contained, however the content of the silane coupling agent in the case of containing in the formulation (A1) and (A2) is generally 5 parts or less, preferably 2 parts or less based one 100 parts of silica. The most preferred is no containing the silane coupling agent. The conditions of kneading the formulation (A1) and (A2) are not particularly restricted. Kneading can be stopped at preferably 150 to 190° C., more preferably 170 to 180° C.

The formulation (A1) and (A2) described above may comprise an extending oil such as aromatic-based oil, naphthenic-based oil and paraffin-based oil. Preferred is aromatic-based oil and the formulation (A1) and (A2) described above can comprise a rubber component oil-extended at least a part of it. The amount of the extending oil is preferably 10 to 60 parts, more preferably 20 to 50 parts based on 100 parts of the rubber component. The amount less than 10 parts leads to an insufficient improvement in the processability, while the amount exceeding 60 parts is also problematic since the ratio of the extending oil to be incorporated during the preparation of a rubber composition for obtaining a required processability is limited.

The expression "preparing a first rubber formulation" means that the first rubber formulation [P1] or [Q1] is obtained by kneading the formulation (A1) or (A2), discharging the kneaded material from the kneader and cooling. While the temperature to which the material is cooled is not limited particularly, it is preferably to a room temperature.

Such sufficient cooling is favorable since it enables a longer duration of the second kneading step in which the upper limit of the temperature should not be so high because of the incorporation of a silane coupling agent.

In the first aspect of the invention, the formulation (B1) comprising the first rubber formulation [P1] and a mixed auxiliary material containing a silane coupling agent is kneaded after obtaining the first rubber formulation by [P1] kneading the formulation (A1). This kneading of the formulation (B1) is performed at a temperature at which a gelation of the rubber does not occur due to the cleavage of the silane coupling agent, and is usually finishing at 130 to 170° C., preferably at 140 to 150° C. After kneading the formulation (B1), the kneaded material is discharged from the kneader, cooled preferably to about room temperature, whereby obtaining the "second rubber formulation [P2]".

Subsequently, the formulation (C) comprising the second rubber formulation [P2], a zinc oxide and a vulcanizing agent is kneaded. It is preferable that the kneading of the formulation (C) is finishing at 100° C. because of the presence of the added vulcanizing agent. After completion of the kneading, the kneaded material is discharged to obtain a rubber composition.

On the other hand, in the second aspect of the invention, after obtaining the first rubber formulation [Q1] by kneading the formulation (A2), the formulation (B2) comprising the first rubber formulation [Q1] and a mixed auxiliary material containing a silane coupling agent is kneaded in a similar way as the (B1) above, and further kneaded the formulation (D) added a mixed auxiliary material containing a zinc oxide. This kneading of the formulation (D) is performed at a temperature at which a gelation of the rubber does not occur due to the cleavage of the silane coupling agent, and is usually finishing at 140 to 160° C., preferably 140 to 150° C. The zinc oxide is preferably incorporated at a temperature not higher substantially than the upper limit specified above, for example, at a temperature lower than the upper limit by 5 to 30° C. After the kneading performed as described above, the kneaded material is discharged from the kneader, cooled preferably to about room temperature, whereby obtaining the "second rubber formulation [Q2]".

Subsequently, the formulation (E) comprising the second rubber formulation [Q2] and a vulcanizing agent is kneaded. It is preferable that the kneading of the formulation (E) is finishing at 100° C. because of the presence of the added vulcanizing agent. After completion of the kneading, the kneaded material is discharged to obtain a rubber composition.

In the first and second aspects of the invention, the kneading temperature can be raised higher since a silane coupling agent is not presented in quantity. Accordingly, the silica can sufficiently be dispersed even with a reduced frequency of the kneading, which is usually three times, whereby reducing the time period required for producing a rubber composition. The kneading time of each formulation is not limited particularly, and may vary depending on the scale of the formulation, the rotor speed of the kneader and the like.

A silica-containing rubber composition may undergo an increase in its Mooney viscosity if a silanol group possessed on the surface of silica remains, resulting in a poor processability. Accordingly, as in the second aspect of the invention, by kneading the formulation (B2) comprising a silane coupling agent before a zinc oxide which is readily adsorbed onto a silica, is incorporated, a silanol group possessed on the surface of silica is consumed, whereby avoiding the poor processability due to an increased viscosity. In addition, the adsorption of a vulcanizing agent incorporated when the formulation (E) is kneaded onto the silica can surely be suppressed and the vulcanization becomes difficult to be inhibited. Thus, the second aspect of the invention gives a rubber composition having a further excellent processability and capable of being vulcanized more easily.

The "conjugated diene-based rubber" described above composed "rubber component" is not particularly restricted. The conjugated diene-based rubber may used a polymer of a conjugated diene monomer such as 1,3-butadiene, isoprene, 2,3-dimethyl-1,3-butadiene and chloroprene, or a copolymer of the conjugated diene monomer with another monomer. Especially when employed as a rubber for a tire, it is preferably a random copolymer by copolymerizing a conjugated diene monomer with an olefinically unsaturated nitrile monomer such as acrylonitrile and methacrylonitrile, an aromatic vinyl monomer such as styrene, 2-methylstyrene, α-methylstyrene, 2,4-dimethylstyrene, 4-tert-butylstyrene and t-butoxystyrene, and other monomers.

In the conjugated diene-based rubber described above, 30 to 100 parts based on 100 parts by this rubber, is preferably a conjugated diene-based rubber having at least one selected from the group consisting of an alkoxysilyl, an amino, a hydroxyl and an epoxy groups. Vulcanized rubber obtained by using a rubber composition containing such a conjugated diene-based rubber having the functional group shows superior tan δ and excellent wearing resistance. Such functional group can be introduced into a rubber molecule by copolymerizing a monomer having such functional group upon producing a conjugated diene-based rubber.

A monomer having an alkoxysilyl group may be used (meth)acryloxymethyl trimethoxysilane, (meth)acryloxymethylmethyl dimethoxysilane, γ-(meth)acryloxypropyl trimethoxysilane, γ-(meth)acryloxypropylmethyl dimethoxysilane, γ-(meth)acryloxypropylmethyl diphenoxysilane, γ-(meth)acryloxypropylmethyl dibenzyloxysilane and the like.

A monomer having an amino group is preferably a monomer having a tertiary amino group including:

(a) dialkylaminoalkyl (meth)acrylates such as dimethylaminomethyl (meth)acrylate, 2-(di-n-propylamino) ethyl(meth)acrylate, 2-dimethylaminopropyl (meth) acrylate, 2-(di-n-propylamino)propyl (meth)acrylate and the like;

(b) N-dialkylaminoalkyl group-containing unsaturated amides such as N-dimethylaminomethyl (meth) acrylamide, N-(2-dimethylaminoethyl) (meth) acrylamide and the like;

(c) tertiary amino group-containing vinyl aromatic compound such as N,N-dimethyl-p-aminostyrene, dimethyl (p-vinylbenzyl)amine, dimethyl (p-vinylphenethyl) amine, dimethyl (p-vinylbenzyloxymethyl)amine, diethyl [2-(p-vinylbenzyloxy)ethyl]amine, 2-vinylpyridine and the like.

Among those listed above, dialkylaminoalkyl (meth) acrylates and tertiary amino group-containing vinyl aromatic compound are preferred.

A monomer having a hydroxyl group includes:

(a) hydroxyalkyl (meth)acrylates such as 2-hydroxyethyl (meth)acrylate, 2-hydroxypropyl (meth)acrylate and the like;

(b) mono (meth)acrylates of a polyalkylene glycol (the number of alkylene glycol units is for example 2 to 23) such as polyethylene glycol, polypropylene glycol and the like;

(c) hydroxyl group-containing unsaturated amide such as N-hydroxymethyl (meth)acrylamide, N-(2-hydroxyethyl) (meth)acrylamide, N,N-bis(2-hydroxyethyl) (meth)acrylamide and the like;

(d) hydroxyl group-containing vinyl aromatic compounds such as o-hydroxystyrene, o-hydroxy-α-methylstyrene, p-vinylbenzylalcohol and the like; and, (e) (meth)allylalcohol and the like.

Among those listed above, hydroxyalkyl (meth)acrylates and hydroxy group-containing vinyl aromatic compounds are preferred.

A monomer having an epoxy group include (meth) allylglycidyl ether, glycidyl (meth)acrylate, 3,4-oxycyclohexyl (meth)acrylate and the like.

A monomer having a particular functional group listed above may be employed alone or in combination of two or more.

The amount of the repeating unit consisting of any of various monomers described above which compose a conjugated diene-based rubber is preferably 0.1 to 10% by mass, more preferably 0.1 to 5% by mass. An amount less than 0.1% by mass results in an insufficient affinity between a conjugated diene-based rubber and a silica, which may lead to an insufficient improvement in the tan δ and the wearing resistance. On the other hand, an amount exceeding 10% by mass tends to give an excessively intense cohesion between a conjugated diene-based rubber and a silica, resulting in a poor processability.

Any functional group listed above can be introduced into a rubber molecule also by using a polymerization initiator or terminator having such functional group in the case of producing a conjugated diene-based rubber.

Such polymerization initiator may be used a reaction product from a secondary amine compound or a tertiary amine compound with an organic alkaline metal compound.

A secondary amine compound may for example be dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, piperidine, pyrrolidine, morpholine and the like.

A tertiary amine compound may be used N,N-dimethyl-o-toluidine, N,N-dimethyl-p-toluidine, N,N-dimethyl-m-toluidine, α-picoline, β-picoline, γ-picoline and the like.

An organic alkaline metal compound is preferably an organic lithium compound such as ethyllithium, propyllithium, n-butyllithium, sec-butyllithium tert-butyllithium, hexyllithium or a mixture thereof, and n-butyllithium and sec-butyllithium are preferred particularly.

The reaction between a secondary amine compound or a tertiary amine compound with an organic alkaline metal compound should be performed at a molar ratio between the active hydrogen in the structure of secondary amine compound or the active hydrogen in the structure of tertiary amine compound and the organic alkaline metal compound within the range from 1:0.2 to 5.0, preferably 1:0.5 to 2.0, more preferably 1:0.8 to 1.2.

The polymerization terminator having a particular functional group listed above may be a polymerization terminator having an epoxy group represented by Formula (1) shown below.

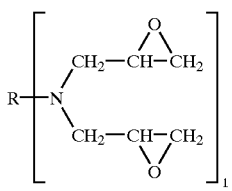

(1)

wherein R is a hydrocarbon group having 1 to 20 carbon atoms, an organic group having no active hydrogen, or a silicon compound, and such hydrocarbon group having 1 to 20 carbon atoms and organic group having no active hydrogen may be alkyl, alkylene, cycloalkyl, aryl, arylene groups and other organic groups having no active hydrogen such as —OH, —SH or —NH— in their molecules. When 2 or more amino groups are present in one molecule, the distance between the amino groups is preferably 12 of C atoms or shorter. In Formula (1), 1 denotes an number of 1 or more, such as 1 to 4, preferably 2.

The polymerization terminator may also be a polymerization terminator having an alkoxysilyl group represented by Formula (2):

$X_n Si(OR)_m R'_{4-m-n}$ (2)

wherein X denotes a halogen atom, preferably a chlorine atom, a bromine atom or an iodine atom. R denotes a hydrocarbon group having 1 to 20, preferably 4 to 20 carbon atoms, thus OR denotes an alkoxyl group having 1 to 20 carbon atoms, preferably a non-hydrolyzable alkoxyl group having 4 to 20 carbon atoms. R' denotes an alkyl group having 1 to 20 carbon atoms, a halogenated alkyl group having 1 to 20 carbon atoms or an aryl group having 6 to 20 carbon atoms. m denotes an number of 1 to 4, n denotes an integer of 0 to 2, and the sum of m and n is 2 to 4.

A polymerization terminator having alkoxysilyl group may be used tetraphenoxy silane, methyl tris(2-ethylhexyloxy) silane, ethyl tris(2-ethylhexyloxy) silane, methyl triphenoxy silane, ethyl triphenoxy silane, vinyl tris(2-ethylhexyloxy) silane, vinyl triphenoxy silane, methyl vinyl bis(2-ethylhexyloxy) silane, ethyl vinyl diphenoxy silane, tri-tert-butoxy mono chloro silane, tri phenoxy mono chlorosilane, mono chloro methyl diphenoxy silane, mono chloro methyl bis(2-ethylhexyloxy) silane, mono bromo ethyl diphenoxy silane, mono bromovinyl dophenoxy silane, mono bromo isopropenyl bis(2-ethylhexyloxy) silane, dichloro-di-tert-butoxy silane, ditolyl dichlorosilane, di-tert-butoxy diiodosilane, diphenoxy diiodosilane, methyl tris(2-methylbutoxy) silane, vinyl tris(2-methylbutoxy) silane, mono chloromethyl bis(2-methylbutoxy) silane, vinyl tris (3-methylbutoxy)silane and the like. Among these methyl triphenoxy silane, ethyl triphenoxy silane and vinyl tris(2-methylbutoxy) silane are preferred.

Furthermore, a polymerization terminator capable of introducing a carboxyl group into a rubber molecule may be a carbonyl group-containing compound including N-methyl-2-pyrrolidone, N,N-dimethylformamide, nicotinamide, 4,4'-bis(diethylamino)benzophenone, a carbamic acid derivative such as methyl carbamate and methyl N,N-diethylcarbamate, an isocyanuric acid derivative such as isocyanuric acid and N,N',N"-trimethylisocyanuric acid as well as a thiocarbonyl-containing compound corresponding to any of the derivative listed above.

The amount of the carbonyl compound as a carbonyl group per 1 g atomic equivalent of an alkaline metal atom of an organic alkalinemetal compound such as an organic lithium compound employed for producing a conjugated diene-based rubber is 0.05 to 5 equivalents, especially 0.1 to 1.5 equivalents.

A conjugated diene-based rubber having a particular functional group described above allows the rubber and a silanol group possessed on a silica to react with each other, whereby increasing the affinity between the rubber and the silica, resulting in a further sufficient reinforcing effect. However, in the case of simultaneous kneading a conjugated diene-based rubber, a silica and a silane coupling agent, as employed conventionally, the silane coupling agent also reacts with a silanol group and thus prevents the reaction between the rubber and the silica, whereby reducing the affinity and the reinforcing effect. Accordingly, the formulation comprising the rubber component containing the conjugated diene-based rubber described above and the silica is kneaded previously to achieve a thorough reaction, and thereafter the silane coupling agent is added and kneaded, whereby giving a priority to the reaction between the rubber and the silica. As a result, a sufficient reinforcing effect is obtained, and a rubber composition having excellent physical properties and giving a vulcanized rubber useful for a tire can be produced.

While a zinc oxide is readily adsorbed onto a silica as described above, it also inhibits the reaction between the conjugated diene-based rubber and the silica. Since a zinc oxide is incorporated in a later step in the invention, anyway it does not inhibit the reaction between the conjugated diene-based rubber and the silica. Accordingly, the reinforcing effect of the silica is further enhanced, and a vulcanized rubber having further excellent properties can be obtained.

The weight-average molecular weight of the conjugated diene-based rubber represented as polystyrene determined by a gel permeation chromatography (GPC) is preferably 100,000 or more, particularly 100,000 to 2,000,000. The weight-average molecular weight less than 100,000 may lead to a reduced wearing resistance of a vulcanized rubber obtained, which may results in an increased tan δ. On the other hand, the molecular weight exceeding 2,000,000 may lead to a poor processability of a rubber composition.

While a method for producing a conjugated diene-based rubber is not limited particularly, solution polymerization and emulsion polymerization are employed. Solution polymerization is preferred. The solution polymerization can be performed by a standard procedure, in which a certain amount of a monomer is charged together with an organic solvent into a reaction vessel, the temperature of the reaction vessel is adjusted, a polymerization initiator is added, the polymerization is initiated, and then, after effecting a sufficient polymerization, the polymerization is terminated by adding an quencher such as various functional group-containing compounds.

A polymerization initiator employed frequently is a lithium-based initiator, and an organic lithium compound is preferred especially. Such organic lithium compound include:

(1) alkyllithium compounds such as n-butyllithium, sec-butyllithium, tert-butyllithium,
(2) alkylene dilithium compound such as 1,4-dilithium butane,
(3) aromatic hydrocarbon lithium compounds such as phenyllithium, stilbene lithium and diisopropenylbenzene lithium as well as a reaction product of an alkyllithium compound listed above with divinylbenzene and the like,
(4) polynuclear hydrocarbon lithium compounds such as lithium naphthalene, and
(5) other lithium compounds such as aminolithium and tributyltin lithium.

This solution polymerization may employ, an ether compound such as dimethoxybenzene and tetrahydrofuran and a tertiary amine such as triethylamine and pyridine in addition to a polymerization initiator described above, for the purpose of randomizing styrene and adjusting the microstructure of a butadiene unit. In addition, an activator such as potassium benzoate and potassium dodecylbenzenesulfonate may also be employed.

An organic solvent may be used a hydrocarbon solvent such as n-hexane, cyclohexane, heptane, benzene and the like.

While the polymerization temperature and the polymerization time period are not limited particularly, the polymerization temperature may be 0 to 130° C., and preferably 10 to 100° C. The polymerization time may range from 5 minutes to 24 hours, and preferably 10 minutes to 10 hours. The polymerization mode may be a batch mode or a continuous polymerization mode.

An attention must be paid to avoid any migration of a halogenated compound, oxygen, water or carbon dioxide which inactivates a polymerization initiator such as an organic lithium compound into a polymerization system.

The polymerization solution after completion of the reaction is supplemented if necessary with an additive such as an antioxidant and then made free of a solvent for example by a steam stripping, and dried for example by a thermal roll, whereby obtaining a conjugated diene-based rubber. When an extending oil is added to the polymerization solution, oil-extended rubber is obtained in a similar way.

The extending oil may be an aromatic-based, a naphthenic-based and a paraffin-based employed usually as an extending oil for a rubber. Preferred is one contained 15 to 50% by mass of the aromatic-based oil.

In the case of producing the conjugated diene-based rubber by emulsion polymerization, emulsion polymerization may be performed by any ordinary method, such as a method in which a certain monomer is emulsified in an aqueous medium in the presence of an emulsifier and the polymerization is initiated using a radical polymerization initiator and then terminated using a polymerization terminator once a predetermined conversion is achieved.

A emulsifier may be used a potassium or sodium salt of a long-chain fatty acid having 10 or more of carbon atoms such as oleic acid and stearic acid, as well as an anionic surfactant such as rosin acid salt. A radical polymerization initiator may be used an organic peroxide such as benzoyl peroxide, di-tert-butyl peroxide and dicumyl peroxide. Those which may also be employed are a diazo compound such as azobisisobutyronitrile, an inorganic peroxide such as potassium persulfate and a redox-based catalyst. Any of these radical polymerization initiators may be used alone or in combination of two or more.

After terminating the polymerization, a resultant conjugated diene-based rubber latex is made free of unreacted monomers if necessary by means of steam stripping and the like, and the conjugated diene-based rubber is aggregated as crumb. This crumb is washed, dewatered and then dried with a drier or the like, whereby obtaining a conjugated diene-based rubber. Alternatively, after preparing an emulsion containing the extending oil by mixing the aqueous solution of an emulsifier and an extending oil, and stirring, it is mixed with the conjugated diene-based rubber latex and aggregated, whereby obtaining an oil-extended rubber. The extending oil may be those described above.

The Mooney viscosity [$ML_{1+4}(100°$ C.)] of the oil-extended rubber is preferably 20 to 150, especially 30 to 100.

The Mooney viscosity [$ML_{1+4}(100°$ C.)] of the rubber component containing the conjugated diene-based rubber is preferably 20 to 200, especially 30 to 150. A Mooney viscosity less than 20 may lead to a reduction in the wearing resistance of a vulcanized rubber, while one exceeding 200 may lead to a reduction in the processability of a rubber composition.

The "silica" described above which is incorporated as a reinforcing agent is not limited particularly, one employed usually as a bright color reinforcing agent for a synthetic rubber can be employed. While the type of a silica is not particularly limited, a wet process type white carbon, a dry process type white carbon, a colloidal silica and a precipitated silica and the like described in Japanese Patent laid-open publication 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037-81) is usually 50 to 400 $m^2/g$, preferably 50 to 220 $m^2/g$, more preferably 70 to 220 $m^2/g$, for the purpose of achieving a sufficient improvement in the reinforcing performance, the wearing resistance and the exothermic behavior, and the like.

The amount of a silica to be used is 10 to 150 parts, preferably 20 to 100 parts based on 100 parts of a rubber component. An amount of a silica less than 10 parts leads to a difficulty in obtaining a sufficient reinforcing effect, resulting in a poor wet skid resistance. On the other hand, 150 parts is enough for obtaining a sufficient reinforcing effect, and no further excessive amount is required.

The silica can also be used in combination with a carbon black, resulting in further reinforced rubber product. While the type of the carbon black is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF and the like. Any of these carbon blacks may be employed alone or in combination of two or more.

While the nitrogen absorption specific surface area of a carbon black determined similarly to a silica is not particularly limited, it is usually 5 to 200 $m^2/g$, preferably 50 to 150 $m^2/g$, more preferably 80 to 130 $m^2/g$, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance, and the like. A further improvement in the wearing resistance can be achieved by using as a carbon black a high structure carbon black described in Japanese Patent laid-open publication 5-230290, whose cetyltrimethylammonium bromide absorption specific surface area is 110 to 170 $m^2/g$ and whose DBP (24M4DBP) oil absorption level after compressing under 165 MPa four times repetitively is 110 to 130 ml/100 g.

When employing the silica and the carbon black, the total amount is preferably 10 to 150 parts, more preferably 50 to 100 parts based on 100 parts of the rubber component described above. A total amount less than 10 parts leads to a difficulty in obtaining a sufficient reinforcing effect, resulting in a problematically poor wet skid resistance. On the other hand, 150 parts is enough for obtaining a sufficient reinforcing effect, and no further excessive amount is required. While the ratio between a silica and a carbon black is not limited particularly, it is preferable that 100 parts of the silica is combined preferably with 5 to 30 parts, especially 10 to 15 parts of the carbon black.

By incorporating the "silane coupling agent" described above in the case of employing the silica, the wearing resistance or the tan δ of a vulcanized rubber can further be improved. Such silane coupling agent is not limited particularly, and may be any one employed usually in a rubber composition produced by incorporating a silica into a conjugated diene-based rubber, such as γ-mercaptopropylmethyl dimethoxysilane, 3-mercaptopropyl trimethoxysilane, bis(3-triethoxysilylpropyl) tetrasulfide, bis(3-triethoxysilylpropyl) disulfide, bis(2-triethoxysilylethyl) tetrasulfide, 3-triethoxysilylpropyl-N,N-dimethylthiocarbayl tetrasulfide, 3-triethoxysilylpropylbenzothiazole tetrasulfide and the like. Any of these silane coupling agents may be employed alone or in combination of two or more. The amount of the silane coupling agent is preferably 1 to 20 parts, especially 2 to 15 parts based on 100 parts of the silica.

The "zinc oxide" described above is not limited particularly and may be one employed usually as a vulcanizing aid for a rubber. Such zinc powder is incorporated in an amount usually of 0.5 to 10 parts, especially 1 to 5 parts based on 100 parts of the rubber component. While a representative "vulcanizing agent" describe above is sulfur, sulfur-containing compounds and peroxides may also be employed. This vulcanizing agent is incorporated in an amount usually of 0.5 to 10 parts, preferably 0.5 to 3 parts based on 100 parts of the rubber component.

The following components may be employed in addition to the silica, the silane coupling agent, the zinc oxide and the vulcanizing agent described above in the rubber composition.

A filler may be used clay, calcium carbonate or magnesium carbonate, which is incorporated in an appropriate amount. The aromatic-based oil, naphthenic-based oil or paraffin-based oil for a rubber may also be incorporated.

Furthermore, a vulcanization accelerator such as aldehydeammonia-based, guanidine-based, thiourea-based, thiazole-based and dithiocarbamic acid-based may be employed, and is incorporated preferably in an amount of 0.5 to 15 parts, especially 1 to 10 parts based on 100 parts of the rubber component. A vulcanizing aid, an antioxidant agent and a processing aid may also be added in appropriate amounts.

A rubber composition produced according to the invention has a satisfactory processability and is useful as a rubber composition for a tire. A vulcanized rubber obtained from this rubber composition has an excellent wet skid resistance and a sufficient wearing resistance and is preferable especially as a tire tread.

DESCRIPTION OF THE PREFERRED EMBODIMENTS

The present invention is further described in the following examples.

[1] Production of Conjugated Diene-based Rubbers and Oil-extended Rubbers

Production Example 1 (Conjugated Diene-based Rubber ①)

A 5-L autoclave reactor purged with nitrogen received 2500 g of cyclohexane, 75 g of tetrahydrofuran, 125 g of styrene and 365 g of 1,3-butadiene. Then the temperature of the reactor was adjusted at 5° C., and 3.45 mmol of n-butyllithium was added to initiate a polymerization. While the polymerization was continued as insulated from heat, the maximum temperature was as high as 80° C. At the time when the percent of polymerization conversion reached 100%, 10 g of 1,3-butadiene was further added, and the polymerization was further continued. And then 0.86 mmol of silicon tetrachloride was added, a polymerization solution containing the conjugated diene-based rubber ① was obtained.

Production Example 2 (Oil-extended Rubber [V])

To the polymerization solution described above containing the conjugated diene-based rubber ①, 2,6-di-tert-butyl-p-cresol was added, and then 187.5 g (corresponding to 37.5 parts per 100 parts of the rubber component contained in the polymerization solution) of an extending oil (FUJIKOSAN CO., LTD., Trade name: "Fucoal Aromax #3") was added. Then, the solvent was removed by a steam stripping, the rubber was dried using a thermal roll adjusted at 115° C., whereby obtaining an oil-extended rubber[V].

Production Example 3 (Oil-extended Rubber [W])

A 5-L autoclave reactor purged with nitrogen received 2500 g of cyclohexane, 8.75 g of tetrahydrofuran, 0.068 g of potassium dodecylbenzenesulfonate, 175 g of styrene and 325 g of 1,3-butadiene containing 150 ppm of 1,2-butadiene. Then the temperature of the reactor was adjusted at 15° C., and 4.15 mmol of n-butyllithium was added to initiate a polymerization. At the time when the percent of polymerization conversion reached 100%, 0.55 mmol of silicon tetrachloride was added and a polymerization solution containing the conjugated diene-based rubber ② was obtained. Then the procedure similar to the Production example 2 was conducted to obtain the oil-extended rubber [W].

Production Example 4 (Oil-extended Rubber [X])

A 5-L autoclave reactor purged with nitrogen received 2500 g of cyclohexane, 75 g of tetrahydrofuran, 125 g of styrene and 365 g of 1,3-butadiene. Then the temperature of the reactor was adjusted at 5° C., and 3.45 mmol of n-butyllithium was added to initiate a polymerization. While the polymerization was continued as insulated from heat, the maximum temperature was as high as 80° C. At the time when the percentage of polymerization conversion reached 100%, 10 g of 1,3-butadiene was further added, and the polymerization was further continued, and then 2.76 mmol of methyl triphenoxysilane was added and the modification reaction was performed for 15 minutes. Subsequently, 0.86 mmol of silicon tetrachloride was added and a polymerization solution containing the conjugated diene-based rubber ③ was obtained. Then the procedure similar to the Production example 2 was conducted to obtain the oil-extended rubber [X].

Production Example 5 (Oil-extended Rubber [Y])

Except for charging 3.45 mmol of piperidine was together with the solvent and the monomers into the autoclave reactor, the procedure similar to Production example 1 was conducted to obtain the conjugated diene-based rubber ④. And the procedure similar to Production example 2 was conducted to obtain the oil-extended rubber [Y].

Production Example 6 (Oil-extended Rubber [Z])

Except for charging 5.52 mmol of 4,4'-bis(diethylamino) benzophenone instead of methyl triphenoxysilane, the procedure similar to Production example 4 was conducted to obtain the conjugated diene-based rubber ⑤. And the procedure similar to Production example 2 was conducted to obtain the oil-extended rubber [Z].

Bound styrene content and the like of conjugated diene-based rubber ① to ⑤ obtained in Production examples 1, 3 to 6 were determined by the method (a) to (e) as described below and shown in Table 1. And the Mooney viscosity of the conjugated diene-based rubber ① and the oil-extended rubber [V] to [Z] was determined by the method (f) and shown in Table 2.

(a) Bound styrene content (% by mass); A rubber was dissolved in toluene and re-precipitated with methanol, and this procedure was repeated twice to purify the rubber, which was then dried in vacuum, subjected to an infrared absorption spectroscopy to obtain a calibration curve based on the absorbance at about 699 cm$^{-1}$ assigned to a phenyl group, from which the bound content was obtained.

(b) 1,2-Bond content in butadiene moiety (%); A rubber was dissolved in toluene and re-precipitated with methanol, and this procedure was repeated twice to purify the rubber, which was then dried in vacuum and subjected to an infrared absorption spectroscopy (MORELLO method), from which the 1,2-Bond content was obtained.

(c) Alkoxysilyl group content (mmol); A rubber was dissolved in toluene and re-precipitated with methanol, and this procedure was repeated twice to purify the rubber, which was then dried in vacuum, subjected to an infrared absorption spectroscopy to obtain a calibration curve based on the absorbance at about 1160 cm$^{-1}$ assigned to an Si—C binding, from which the alkoxysilyl group content per 100 g of a conjugated diene-based rubber was obtained.

(d) Amino group content (mmol); Based on "Acid-base titration in organic solvent using perchloric acid—acetic acid solution" described in J.Anal.Chem., vol.24, 564 (1952), the following method was employed for a quantification.

Chloroform as a solvent in which a rubber was solved and methyl violet as a titration indicator were employed, and the content per 100 g of a conjugated diene-based rubber was obtained from the calibration curve made previously using tri-n-octylamine solutions at known concentrations.

(e) Hydroxyl group content (mmol); A rubber was dissolved in toluene and re-precipitated with methanol, and this procedure was repeated twice to purify the rubber, which was then dried in vacuum, subjected to an elemental analysis to obtain an oxygen content, from which the hydroxyl group content per 100 g of a conjugated diene-based rubber was obtained.

(f) Mooney viscosity [$ML_{1+4}$ (100° C.)]; A measurement was conducted using an L-shaped rotor in accordance with JIS K 6300-1994. The condition involved a determination temperature of 100° C., a preliminary heating for 1 minutes and a rotor operation time of 4 minutes.

TABLE 1

| Conjugated diene-based rubber | | ① | ② | ③ | ④ | ⑤ |
|---|---|---|---|---|---|---|
| Bound styrene content | (wt %) | 26 | 35 | 26 | 35 | 25 |
| 1,2-Bond content in butadiene moiety | (%) | 70 | 42 | 69 | 43 | 70 |
| Alkoxysilyl group content | (mmol/100 g) | | | 0.45 | | |
| Amino group content | (mmol/100 g) | | | | 0.69 | 1.06 |
| Hydroxyl group content | (mmol/100 g) | | | | | 0.53 |

TABLE 2

| Oil-extended rubber | [V] | [W] | [X] | [Y] | [Z] |
|---|---|---|---|---|---|
| Conjugated diene-based rubber ① | 100 | | | | |
| Conjugated diene-based rubber ② | | 100 | | | |
| Conjugated diene-based rubber ③ | | | 100 | | |
| Conjugated diene-based rubber ④ | | | | 100 | |
| Conjugated diene-based rubber ⑤ | | | | | 100 |
| Extending oil | 37.5 | 37.5 | 37.5 | 37.5 | 37.5 |
| Mooney viscosity [$ML_{1+4}$ (100° C.)] | 43 | 37 | 41 | 39 | 45 |

[2] Production of Rubber Compositions

Rubber compositions were produced using the conjugated diene-based rubber obtained above or the oil-extended rubber and a variety of auxiliary components by the formulation compositions shown in Table 3. The unit of each component is part.

TABLE 3

| Formulation composition | [A] | [B] | [C] | [D] |
|---|---|---|---|---|
| Oil-extended rubber | 0 | 96.25 | 96.25 | 96.25 |
| Conjugated diene-based rubber ① | 70 | 0 | 0 | 0 |
| Butadiene rubber | 30 | 30 | 30 | 30 |
| Silica | 70 | 70 | 70 | 70 |
| Silane coupling agent | 5.6 | 5.6 | 5.6 | 4.2 |
| Carbon black | 5.6 | 5.6 | 5.6 | 5.6 |
| Extending oil | 37.5 | 11.3 | 1.3 | 5.7 |
| Zinc oxide | 3 | 3 | 3 | 3 |
| Stearic acid | 2 | 2 | 2 | 2 |
| Antioxydant | 1 | 1 | 1 | 1 |
| Wax | 1 | 1 | 1 | 1 |
| Sulfur | 1.5 | 1.5 | 1.5 | 1.5 |
| Vulcanization accelerator (a) | 1.5 | 1.5 | 1.5 | 1.5 |
| Vulcanization accelerator (b) | 1 | 1 | 1 | 1 |

The components incorporated in the formulation compositions described above were as follows.

1) Butadiene rubber; JSR Corp., Trade name: "BR01"
2) Silica; NIPPON SILICA INDUSTRIAL CO., LTD., Trade name: "NIPSIL AQ"
3) Silane coupling agent; DEGUSA HULS, Trade name: "Si69"
4) Carbon black; MITSUBISHI CHEMICAL CORP., Trade name: "DIABLACK H"
5) Extending oil; FUJIKOSAN CO., LTD., Trade name: "Fucoal Aromax #3"
6) Zinc oxide; SEIDO CHEMICAL CO., LTD., Trade name: "Zinc oxide 3"
7) Stearic acid; NEW JAPAN CHEMICAL CO., LTD., Trade name: "500S"
8) Antioxidant; OUCHISHINKO CHEMICAL INDUSTRIAL CO., LTD., Trade name: "NOCRAC 810NA"
9) Wax; OUCHISHINKO CHEMICAL INDUSTRIAL CO., LTD., Trade name: "SUNNOC"
10) Vulcanization accelerator (a); OUCHISHINKO CHEMICAL INDUSTRIAL CO., LTD., Trade name: "NOCCELER CZ"
11) Vulcanization accelerator (b); OUCHISHINKO CHEMICAL INDUSTRIAL CO., LTD., Trade name: "NOCCELER D"
12) Sulfur; Trade name: TSURUMI CHEMICAL CO., LTD., "Sulfax 200S"

EXAMPLE 1

Rubber composition shown in Table 4 was produced using the conjugated diene-based rubber ① whose Mooney viscosity is 98 by the formulation composition [A] shown in Table 3.

The 250cc LABOPLASTMILL (TOYOSEIKI CO., LTD.,) received the conjugated diene-based rubber ① and a mixed auxiliary material not containing a silane coupling agent, zinc oxide, sulfur and vulcanization accelerator. The temperature of an oil in a jacket was controlled 110° C., and the mixture was kneaded at a rotor speed of 70 rpm. When the device temperature reached 175° C., the kneaded material was discharged to obtain a first rubber formulation.

After that, the first rubber formulation and a silane coupling agent were charged into the same kneader above and kneaded under the same condition. When the device temperature reached 145° C., the kneaded material was discharged to obtain a second rubber formulation.

Subsequently, the second rubber formulation, zinc oxide, sulfur and vulcanization accelerator were charged into the same kneader above. And the mixture was kneaded at a rotor speed of 60 rpm, after the temperature of the oil in a jacket was controlled 70° C. When the device temperature reached 95° C., the kneaded material was discharged to obtain an intended rubber composition. Total number of kneading in this production was three.

EXAMPLE 2

Except for using the oil-extended rubber [X] and formulation composition [C] instead of the conjugated diene-based rubber ① in Example 1 and the formulation composition [A], the procedure similar to that in Example 1 was performed to obtain a rubber composition.

EXAMPLE 3 to 6

Except for changing the oil-extended rubber [X] in Example 2 to ones shown in Table 4, the procedure similar to that in Example 2 was performed to obtain rubber compositions.

EXAMPLE 7 and 8

Except for changing the formulation composition [C] in Example 2 to ones shown in Table 4, the procedure similar to that in Example 2 was performed to obtain rubber compositions.

EXAMPLE 9

Rubber composition shown in Table 4 was produced using the oil-extended rubber [X] by the formulation composition [C] shown in Table 3.

The first rubber formulation in Example 2 and a silane coupling agent were charged into the same kneader above and kneaded under the same condition. When the device temperature reached 130° C., zinc oxide was added to the mixture and further kneaded. And the kneaded material was discharged to obtain a second rubber formulation at 145° C.

After that the second rubber formulation, sulfur and vulcanization accelerator were charged into the same kneader above. And the mixture was kneaded at a rotor speed of 60 rpm, after the temperature of the oil in a jacket was controlled 70° C. When the device temperature reached 95° C., the mixture was discharged to obtain an intended rubber composition.

Comparative Example 1

Rubber composition shown in Table 5 was produced using the oil-extended rubber [X] by the formulation composition [B] shown in Table 3.
(i) The oil-extended rubber [X] and a mixed auxiliary material not containing zinc oxide, sulfur and vulcanization accelerator were charged into the same kneader above. The temperature of an oil in a jacket was controlled 110° C., and the mixture was kneaded at a rotor speed of 70 rpm. When the device temperature reached 145° C., the kneaded material was discharged to obtain a first rubber formulation.
(ii) The first rubber formulation, zinc oxide, sulfur and vulcanization accelerator were charged into the same kneader above. And the mixture was kneaded at a rotor speed of 60 rpm, after the temperature of the oil in a jacket was controlled 70° C. When the device temperature reached 95° C., the kneaded material was discharged to obtain an intended rubber composition.

Comparative Example 2

Except for repeating the procedure (i) described above after the first formulation in Comparative example 1 was cooled to about room temperature, the procedure similar to that in Comparative example 1 was performed to obtain a rubber composition.

Comparative Example 3

Except for repeating the procedure (i) described above further three times after the first formulation in Comparative example 1 was cooled to about room temperature, the procedure similar to that in Comparative example 1 was performed to obtain a rubber composition.

Comparative Example 4

Except for using the formulation composition [C] and the oil-extended rubber [V] instead of the formulation composition [B] and the oil-extended rubber [X], the procedure similar to that in Comparative example 1 was performed to obtain a rubber composition.

Comparative Example 5

Except for repeating the procedure (i) further twice after the first formulation in Comparative example 4 was cooled to about room temperature, the procedure similar to that in Comparative example 4 was performed to obtain a rubber composition.

Comparative Example 6

Except for using the formulation composition [C] instead of the formulation composition [B], the procedure similar to that in Comparative example 1 was performed to obtain a rubber composition.

Comparative Example 7

Except for repeating the procedure (i) further twice after the first formulation in Comparative example 6 was cooled to about room temperature, the procedure similar to that in Comparative example 6 was performed to obtain a rubber composition.

Comparative Example 8

Except for using the formulation composition [A] and the conjugated diene-based rubber ① instead of the formulation [B] and the oil-extended rubber [X], the procedure similar to that in Comparative example 3 was performed to obtain a rubber composition.

TABLE 4

| | Example | | | | | | | | |
|---|---|---|---|---|---|---|---|---|---|
| | 1 | 2 | 3 | 4 | 5 | 6 | 7 | 8 | 9 |
| Formulation composition | [A] | [C] | [C] | [C] | [C] | [C] | [B] | [D] | [C] |
| Conjugated diene-based rubber | ① | — | — | — | — | — | — | — | — |
| Oil-extended rubber | — | [X] | [V] | [W] | [Y] | [Z] | [X] | [X] | [X] |
| Number of kneading | 3 | 3 | 3 | 3 | 3 | 3 | 3 | 3 | 3 |
| Mooney viscosity of rubber composition | 83 | 79 | 85 | 87 | 83 | 82 | 66 | 83 | 82 |
| Hardness | 71 | 70 | 73 | 73 | 71 | 70 | 65 | 70 | 71 |
| tan δ (0° C.) | 0.291 | 0.349 | 0.302 | 0.251 | 0.278 | 0.343 | 0.368 | 0.352 | 0.366 |
| tan δ (50° C.) | 0.128 | 0.114 | 0.125 | 0.130 | 0.110 | 0.120 | 0.091 | 0.109 | 0.115 |
| Lambourn wear Index | 104 | 135 | 108 | 121 | 123 | 118 | 98 | 122 | 137 |

TABLE 5

| | Comparative example | | | | | | | |
|---|---|---|---|---|---|---|---|---|
| | 1 | 2 | 3 | 4 | 5 | 6 | 7 | 8 |
| Formulation composition | [B] | [B] | [B] | [C] | [C] | [C] | [C] | [A] |
| Conjugated diene-based rubber | — | — | — | — | — | — | — | ① |
| Oil-extended rubber | [X] | [X] | [X] | [V] | [V] | [X] | [X] | — |
| Number of kneading | 2 | 3 | 5 | 2 | 4 | 2 | 4 | 5 |
| Mooney viscosity of rubber composition | 82 | 75 | 71 | 105 | 94 | 105 | 90 | 75 |
| Hardness | 69 | 67 | 66 | 78 | 75 | 75 | 73 | 68 |
| tan δ (0° C.) | 0.379 | 0.365 | 0.370 | 0.305 | 0.295 | 0.352 | 0.331 | 0.273 |
| tan δ (50° C.) | 0.121 | 0.115 | 0.110 | 0.130 | 0.125 | 0.115 | 0.118 | 0.131 |
| Lambourn wear Index | 107 | 101 | 89 | 94 | 90 | 105 | 102 | 85 |

[3] Evaluation of Physical Properties of the Rubber Compositions and Vulcanized Rubbers The Mooney viscosity of each of the rubber composition of Examples 1 to 9 and Comparative 1 to 8 was determined by the method described above. Each rubber composition was vulcanized using a vulcanizing press at 160° C. for 30 minutes, and the vulcanized rubber made from each rubber composition of Examples and Comparatives was examined for its physical properties. The results are shown in Tables 4 and 5.

The physical properties in Tables 4 and 5 were determined by the methods described below.

(1) Hardness; JIS A Hardness determined in accordance with JIS K 6253.
(2) tan δ; A tan δ was determined using a dynamic spectrometer manufactured by RHEOMETRICS in the United States at a tensile dynamic strain of 1%, a frequency of 10 Hz and a temperatures of 50° C. A larger value represented as an exponential value reflects a lower rolling resistance, which is favorable. A tan δ at 0° C. was determined using the same instrument at a tensile dynamic strain of 0.1%. A larger value, represented as an exponential value, reflects a larger wet skid resistance, which is favorable.
(3) Lambourn wear Index; A wear level was calculated at a slip rate of 25% using a Lambourn wearing tester. The measurement was made at 25° C. A larger Index reflects a better wearing resistance.

Base on the results shown in Table 4, any of Comparatives 1 to 8 suffered from an insufficiently dispersed silica in spite of the rubber components and the formulation compositions similar to those in Example, because of the simultaneous kneading of the rubber component, a silica and a silane coupling agent at first, resulting in a poor processability. And the vulcanized rubbers were also low in balance of the physical properties. In the case of the combination between the formulation composition and the oil-extended rubber used was the same, the Mooney viscosity tended to lower depending on the number of kneading. And also the Lambourn wear Index of the vulcanized rubber was decreased.

On the other hand, each of the rubber compositions of Examples 1 to 8 shown in Table 4 is considered to have a sufficient processability. Each of the vulcanized rubbers obtained from the rubber compositions exhibited a satisfactory performance, although there was a difference between the rubber components employed and also between the formulation compositions employed. Especially since each of vulcanized rubber had a large tan δ at 0° C. and a small tans at 50° C., it is assumed to have a large wet skid resistance and a small rolling resistance when converted into a tire. In addition, a sufficiently large Lambourn wear Index reflected an excellent wearing resistance of a vulcanized rubber.

While the invention is not limited to Examples described above, and may be the examples which are modified diversely within the scope of the invention. For example, additives such as carbon black, stearic acid, wax and the like were employed as constituents of the first rubber formulation in Example 1, but they may be the constituents of the second rubber formulation, and thus the order of the addition of each additive is not limited particularly. Alternatively, the additives may be charged separately.

What is claimed is:

1. A method for producing a rubber composition comprising:
preparing a first rubber composition Q1 by kneading a formulation A2 comprising a rubber component comprising a conjugated diene-based rubber and a silica;
preparing a second rubber formulation Q2 by kneading a formulation B2 comprising a mixed auxiliary material containing silane coupling agent and said first rubber formulation Q1 and then further kneading a formulation D of a mixed auxiliary material comprising a zinc oxide with said formulation B2; and kneading a formulation E comprising said second rubber formulation Q2 and a vulcanizing agent.

2. The method for producing a rubber composition according to claim 1, wherein a terminal temperature for kneading said formulation A2 is 150 to 190° C., and a terminal temperature for kneading said formulation D is 140 to 160° C.

3. The method for producing a rubber composition according to claim 2, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy group.

4. The method for producing a rubber composition according to claim 3, wherein formulation A2 further comprises an extending oil.

5. A rubber composition produced by
preparing a first rubber formulation Q1 by kneading a formulation A2 comprising a rubber component comprising a conjugated diene-based rubber and a silica;
preparing a second rubber formulation Q2 by kneading a formulation B2 comprising a mixed auxiliary material comprising a silane coupling agent and said first rubber formulation Q1 and then further kneading a formulation D of a mixed auxiliary material comprising a zinc oxide with said formulation B2; and
kneading a formulation E comprising said second rubber formulation Q2 and a vulcanizing agent.

6. The rubber composition according to claim 5, wherein a terminal temperature for kneading said formulation A2 is 150 to 190° C., and a terminal temperature for kneading said formulation D is 140 to 160° C.

7. The rubber composition according to claim 6, wherein 30 to 100 parts by mass of said conjugated diene-based rubber based on 100 parts by mass of said conjugated diene-based rubber, is a conjugated diene-based rubber having at least one selected from the group consisting of an alkoxysilyl, an amino, a hydroxyl and an epoxy group.

8. The rubber composition according to claim 7, further comprising 5 to 30 parts by mass of carbon black based on 100 parts by mass of said silica.

9. The rubber composition according to claim 7, further comprising an extending oil in said formulation A1.

10. The rubber composition according to claim 9, further comprising 5 to 30 parts by mass of carbon black based on 100 parts by mass of said silica.

11. The method for producing a rubber composition according to claim 1, wherein said rubber component further comprises an oil-extended conjugated diene-based rubber.

12. The method for producing a rubber composition according to claim 11, wherein 30 to 100 parts by mass of said conjugated diene-based rubber based on 100 parts by mass of said conjugated diene-based rubber, is a conjugated diene-based rubber having at least one selected from the group consisting of an alkoxysilyl group, an amino group, a hydroxyl group and an epoxy group.

13. The method for producing a rubber composition according to claim 12, wherein formulation A2 further comprises an extending oil.

14. The rubber composition according to claim 5, wherein said rubber component in formulation A2 further comprises an oil-extended conjugated diene-based rubber.

15. The method for producing a rubber composition according to claim 14, wherein 30 to 100 parts by mass of said conjugated diene-based rubber based on 100 parts by mass of said conjugated diene-based rubber, is a conjugated diene-based rubber having at least one selected from the group consisting of an alkoxysilyl group, an amino group, a hydroxyl group and an epoxy group.

16. The rubber composition according to claim 15, comprising 5 to 30 parts by mass of carbon black based on 100 parts by mass of said silica.

* * * * *